United States Patent
Müller

(10) Patent No.: US 7,804,267 B2
(45) Date of Patent: Sep. 28, 2010

(54) CORRECTION METHOD FOR MICROPROCESSOR-CONTROLLED DIGITAL REGULATION

(75) Inventor: Ralf Müller, Berlin (DE)

(73) Assignee: Francotyp-Postalia GmbH (DE)

( * ) Notice: Subject to any disclaimer, the term of this patent is extended or adjusted under 35 U.S.C. 154(b) by 331 days.

(21) Appl. No.: 12/120,892

(22) Filed: May 15, 2008

(65) Prior Publication Data

US 2008/0303468 A1   Dec. 11, 2008

(30) Foreign Application Priority Data

Jun. 6, 2007   (DE) .................. 10 2007 026 344

(51) Int. Cl.
G05D 23/275   (2006.01)
(52) U.S. Cl. .................. 318/600; 318/601; 318/603; 318/610; 318/632
(58) Field of Classification Search ......... 318/600–603, 318/609, 610, 632; 700/11, 14, 63, 150, 700/151; 402/89, 90, 94, 96, 106, 145, 146
See application file for complete search history.

(56) References Cited

U.S. PATENT DOCUMENTS

| | | | |
|---|---|---|---|
| 3,705,400 A * | 12/1972 | Cordes, Jr. .................. 341/118 |
| 4,636,959 A | 1/1987 | Salazar et al. | |
| 5,083,072 A | 1/1992 | Song | |
| 5,367,236 A | 11/1994 | Salazar | |
| 5,789,658 A | 8/1998 | Henn et al. | |
| 6,000,869 A | 12/1999 | Lee | |
| 6,247,774 B1 | 6/2001 | Mueller | |
| 6,304,825 B1 * | 10/2001 | Nowak et al. .................. 702/94 |
| 6,445,961 B1 * | 9/2002 | Melvin ..................... 700/32 |
| 6,538,407 B2 | 3/2003 | Tanaka | |
| 6,839,653 B2 | 1/2005 | Gerlach | |
| 7,245,103 B2 * | 7/2007 | Chapman et al. ............ 318/651 |
| 7,576,509 B2 * | 8/2009 | Komatsu et al. ............ 318/567 |
| 7,633,256 B2 * | 12/2009 | Reichert et al. ............. 318/602 |

FOREIGN PATENT DOCUMENTS

| | | |
|---|---|---|
| DE | 197 30 806 | 1/1999 |
| EP | 0 584 566 | 7/1993 |
| GB | 2 404 100 | 1/2005 |
| JP | 2000-236688 | 8/2000 |

* cited by examiner

*Primary Examiner*—Bentsu Ro
*Assistant Examiner*—Thai Dinh
(74) *Attorney, Agent, or Firm*—Schiff Hardin LLP

(57) ABSTRACT

In a correction method for a microprocessor-controlled digital regulation of a drive motor, wherein the measurement arrangement used for the regulation of the motor is simplified, recognizing that the real value surveying cannot always be implemented periodically by the microprocessor at the requested point in time, making sporadic measurement errors of a simplified measurement arrangement ineffectual, in accordance with the method individual measurement values with a sudden change are read out and correction values are used instead of these for the regulation.

11 Claims, 4 Drawing Sheets

CORRECTION METHOD FOR MICROPROCESSOR-CONTROLLED DIGITAL REGULATION

BACKGROUND OF THE INVENTION

1. Field of the Invention

The present invention concerns a correction method for microprocessor-controlled digital regulation of the type that serves to compensate time-delayed accesses to real values given digital regulations, for example for a motor regulation. The invention is suitable for use in apparatuses with relative movement between a thermotransfer print head and the item to be printed, in particular in franking and addressing machines, in peripheral apparatuses or in other post-processing apparatuses.

2. Description of the Prior Art

Motor regulation generally involves the detection of the real (actual) value of an operating characteristic of the motor and comparison with the desired value. The motor is accelerated if the real value is smaller and braked in the reverse case. In digital regulation it is important to implement measurement value surveys at constant time intervals. This can be implemented by a hardware but also by the processor itself for cost reasons.

A franking machine with microprocessor-controlled direct current motor for control of the franking machine and a corresponding method are known from the European patent EP 177 055 B2 in order to move or drive a number of loads which can be selectively coupled with a drive shaft. The angular offset of the drive shaft is detected in order to control the direct current motor such that the actual angular offset coincides with the desired angular offset. The direct current motor is controlled by a computer via a power circuit with pulse width-modulated motor control signals. An encoder consists of an encoder disc with a number of linear gaps and an optical sensor device which emits two phase-shifted encoder signals at the output.

A motor control method and a motor control apparatus for a printer in which encoder pulses are delivered to a controller (which calculates a speed from these, among other things) is known from the EP 1 755 011 A2.

A system for downtime determination for a direct current motor which can be overdriven for a short period in order to achieve a high acceleration is known from the European patent EP 589 668 B2. A post-processing system requires a precise servo controller in order to achieve a high throughput of mail pieces. It would thus be destructive if the motor were to fail due to an overdrive during a jam. An average delay threshold was therefore proposed which represents a maximum desired operating limit.

A franking machine with an inkjet device that has at least one main drive motor and additional motors, a stationary print head as well as an encoder is disclosed in U.S. Pat. No. 6,247,774, wherein a microprocessor is connected in terms of control with the main drive motor as well as with the encoder via a controller (ASIC). The main drive motor is mechanically coupled with a transport roller for transport of mail pieces past the print head. The transport roller moves a deflection roller via a transport belt, which deflection roller is mechanically coupled with the encoder. The transport speed must be kept constant in order to generate a qualitatively high-grade imprint on the mail piece by means of the print head during the transport of the mail piece past the print head.

The deflection roller advantageously has the same rotation speed as the transport roller. For example, the encoder consists of an encoder disc and a light barrier, wherein the disc interrupts a light beam at all points at which the disc has no slit. If the encoder has an encoder disc with only one slit, only one pulse is generated per rotation.

Alternatively, the encoder has an encoder disc with a plurality of slits. More than just one pulse is thus correspondingly generated per rotation, and it is possible to detect the angular offset of the drive shaft.

In a franking machine either hardware is required which unburdens the microprocessor in the motor regulation or it must be accepted that the processor is busy with other, uninterruptible tasks and thus no periodic sampling of measurement values is possible. Such an uninterruptible task is, for example, an Interrupt Service Routine (ISR).

The highest priority interrupt command is not used for the motor regulation, rather an interrupt command of equal or lesser ranking. It can therefore occur that a different interrupt of the same or higher priority must be processed first by the processor, such that the real value surveying of a measurement series cannot always be implemented periodically at the requested point in time, such that individual measurement values occur with a sudden change that cannot originate from the motor-load system because its inertia does not allow a sudden speed change. Rather, this sudden deviation is based on a failure of the measurement circuit to adhere to the sampling point in time that is predetermined by the encoder pulse. Since multitasking operating systems are normally used in modern processor systems, the problem results that the processor cannot implement the real value survey at the required point in time.

SUMMARY OF THE INVENTION

An object of the present invention is to provide a correction method for a microprocessor-controlled digital regulation of a drive motor, wherein the circuit used for the regulation of the motor should be simplified with regard to the component expenditure, in spite of which it is to be assumed that a non-special measurement circuit reduced to just an encoder and a timer cannot prevent that the real value survey can not always be implemented periodically by the microprocessor at the required point in time. A measurement error therefore sporadically occurs whose effect should be prevented or remedied via suitable measures.

The above object is achieved in accordance with the present invention by a correction method for microprocessor controlled digital regulation of a drive motor, wherein the arrangement used for the regulation of the drive motor is simplified by not requiring a special measurement circuit, but instead using a measurement circuit reduced to only an encoder and a timer, and wherein the real or actual value monitoring is not necessarily implemented by the microprocessor at predetermined points in time that are defined by encoder pulses. Instead, individual measurement values of a measurement series of values that represent an operational characteristic of the motor are identified that exhibit a sudden change from a previous measurement value to the current measurement value. The individual measurement values differ from gradually changing measurement values. An individual measurement value that exhibits a sudden change is sorted out from the measurement value series and is corrected to effect regulation of the motor, by replacing any measurement value that exhibits a sudden change with an at least partially corrected measurement value.

The method makes sporadic measurement errors of a simplified measurement arrangement ineffectual. As noted above, no special measurement circuit is used, but rather an arbitrary measurement circuit reduced to just an encoder and a timer is used, which measurement circuit is connected with a microprocessor or is a component of the microprocessor. As used herein, a "timer," means an interconnection of clock pulse emitter and counter. The microprocessor is programmed to store and to read out measurement values of a measurement series and to sort out individual measurement values exhibiting a sudden change and to make them ineffectual for the regulation. The measurement values that are sorted out are replaced by values that are at least partially corrected.

The measurement values can be count values representing a number that is proportional to a measurement time period. The microprocessor is programmed by suitable software for calculation of speed values from the count values, for evaluation and correction of said speed values and for provision of control pulses for a drive motor.

It is assumed that the measured numerical time values are reduced upon starting the regulation because the speed (for example of goods in a transport device or the rotation speed of a drive motor shaft or of an encoder disc) initially rises. The respective values of the measurement values thus also normally change gradually. If, given an effective regulation, the average value of a number of measurement values does not change further in a next time segment but a current measurement value deviates therefrom in value, at least a partial correction of this individual measurement value is required since it is physically impossible that the speed suddenly changes in the direction of a higher speed, or that the measured time period is suddenly reduced.

DESCRIPTION OF THE PREFERRED EMBODIMENTS

Figure 1:
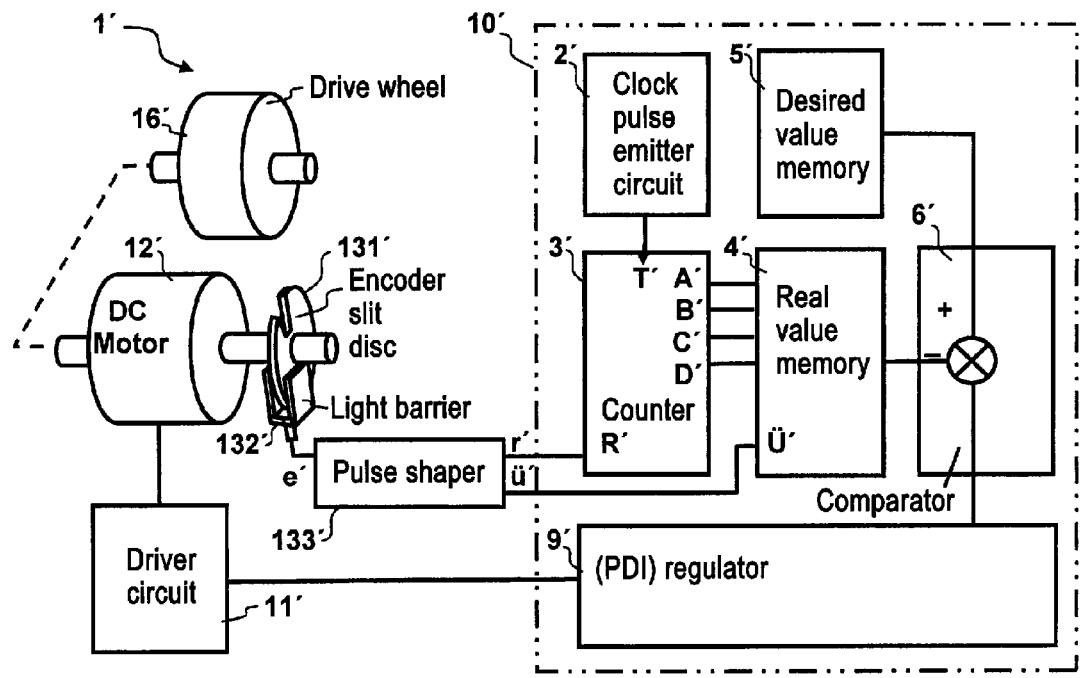
FIG. 1 illustrates a conventional hardware measurement arrangement in a circuit arrangement for motor rotation speed regulation.

FIG. 1 shows a conventional hardware measurement arrangement in a circuit arrangement for motor rotation speed regulation. The motor rotation speed regulation 1' has a direct current motor 12' mechanically coupled with a drive wheel 16'. An encoder slit disc 131' is positively and non-positively fastened on the motor shaft, for example. A light barrier 132' generates the encoder pulses' upon rotation of the shaft. A pulse shaper 133' can be provided to which the encoder pulses e' are supplied. A measurement control and regulation circuit 10' has a PDI regulator 9' that is connected on the output side with the direct current motor 12' via a driver circuit 11' in terms of control and that is connected with the output of a comparator 6' at the input side. This can thereby be a digital comparator.

Alternatively, an analog comparator can also be used, wherein D/A converters are connected at its inputs and an A/D converter is connected at its outputs (not shown).

The measurement arrangement includes a clock pulse emitter circuit 2' having an output connected with a clock input of a first counter 3'. The binary-coded data outputs A', B', C' and D' of the first counter 3' are connected with corresponding data inputs of a real value memory 4'. The latter has a control input Ü' for initiation of a surveying of BC data of the counter 3' via its outputs. The binary-coded data (BCD) correspond to a count value Z. A control input R' for resetting the counter 3' and the control input Ü' of the real value memory 4' are connected with corresponding outputs of the pulse shaper 133' or of a correspondingly equipped encoder.

The encoder generates at least one encoder pulse e' per rotation of the shaft and the encoder slit disc attached thereon. A reset signal r' is only fed to the counter 3' via the control input R' after a control signal ü' for data transfer was fed into the real value memory 4' via the control input Ü' and the data transfer of the count value Z (that corresponds to the time measurement value) has occurred. For example, the counter 3' can be executed as a forward counter, the real value memory 4' can be executed as a parallel-serial converter and the digital comparator 6' can be executed as a backward counter. A digital desired value memory 5' is connected with default inputs of the backwards counter. The parallel-serial converter can be a disc register which is read out in a clock-controlled manner, wherein the number input of the backward counter is connected to the serial data output of said parallel-serial converter (not shown). The digital real value is lower than the digital desired value upon run-up of the control variable and upon operation under load, and consequently the motor rotation speed is readjusted corresponding to the difference resulting from the comparison.

The rotation speed is a variable that indicates how often a shaft rotates in one minute (min=60 s), for example. It is required to calculate to the rotation speed $v_u$. The rotation speed $v_u$ is specified in meters per second (m/s) and is equal to diameter d (in m) times π (3.14159265358979323846264338322795 . . . ) times rotation speed n (in s$^{-1}$) according to the formula:

$$v_u = d \cdot \pi \cdot n / 60 \qquad /1/$$

For a linear, steady, constant speed (for example of the transport belt), the relation of the traveled path s in meters (m) divided by the time t in seconds (s) required for this applies according to the formula:

$$v = s/t \qquad /2/$$

After equalization and conversion of the equations /1/ and /2/, the following equations apply for transport paths and times:

$$s = v \cdot t = d \cdot \pi \cdot t \cdot n / 60 \qquad /3/$$

$$t = s/v = 60 \cdot s / (d \cdot \pi \cdot n) = C/n \qquad /4/$$

The rotation speed n is inversely proportional to the time t. The proportionality factor C is constant. Moreover, the return of an encoder pulse applies for a count value Z of the counter given a period duration P:

$$t = Z/P \text{ with P in (1/sec), P=constant} \qquad /5/$$

as well as with Z=count value of a counter.

If the equation /5/ is used for the measurement time t in the equation /2/, the equation /6/ results from this:

$$v = (s \cdot P)/Z = K/Z \text{ with K=constant} \qquad /6/$$

The speed v results reciprocally from the count value of the counter.

Figure 2:
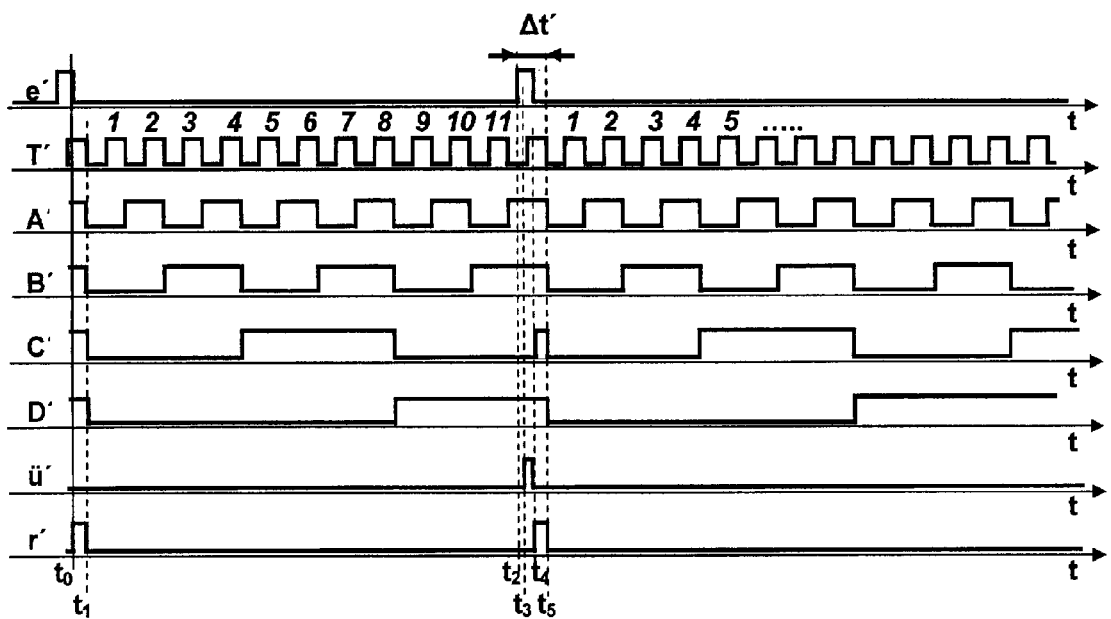
FIG. 2 is a pulse/time diagram for a measurement workflow in the conventional hardware measurement arrangement.

A pulse/time diagram of the measurement produce in the conventional hardware measurement arrangement is shown in FIG. 2. Only the signals of the four outputs A', B', C' and D' of the counter were shown for simplicity'. However, this is not to be understood in such a way that the numerical range of the counter is limited to 16. Rather, the numerical range can be arbitrarily enlarged. A reset pulse r' that causes a resetting of the count value Z to a starting value $Z_0$ is triggered at a point in time $t_0$, such that all outputs A', B', C' and D' of the counter are at low-level at the point in time $t_1$. Given an H/L edge of the first clock pulse 1 at the clock input T', the switching state at the output A' flips from low-level to high-level. It can be seen that a new measurement is enabled immediately after the occurrence of an encoder pulse of the signal e'. The counter 3' measures the times between two encoder signals by counting the clock pulses. The time duration Δt during which no measurement is possible is advantageously small. A continuative counting of the clock pulses from 11 to 12 ensues until the counter can be reset, which leaves the precision of the measurement unaffected, however. However, the hardware expenditure for a conventional hardware measurement arrangement according to FIG. 1 is disadvantageously high. The invention, in contrast to the circuit shown in FIG. 1, embodies a circuit that is simplified with regard to the component expenditure is used in order to lower the manufacturing costs.

Figure 3:
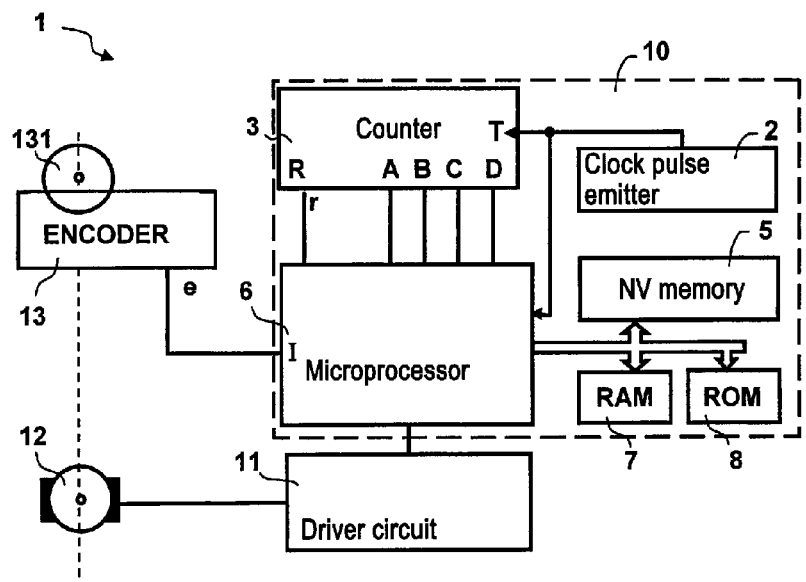
FIG. 3 is a circuit arrangement of a simplified hardware measurement arrangement in accordance with the invention.

A circuit arrangement of the simplified hardware measurement arrangement is shown in FIG. 3 which consists of a timer 2, 3 and an encoder 13 that are connected with a microprocessor. The timer and microprocessor are components of a measurement, control and regulation circuit 10. The microprocessor 6 is connected with the outputs of a counter 3 and a clock pulse emitter 2 is connected with the clock or, respectively, count input of the counter 3. The microprocessor 6 is furthermore connected in terms of addressing, control and data at least with one non-volatile memory 5 for desired values, with a volatile working memory (RAM) 7 for real values (i.e. measurement values such as count values or, respectively, speed values) and with a program memory (ROM) 8. The output of the microprocessor 6 is connected in terms of control with a direct current motor 12 via a driver circuit 11. An interrupt input I of the microprocessor 6 is electrically connected with the output of the encoder 13. The encoder 13 has an encoder disc 131 that is again mechanically coupled with the shaft of the direct current motor 12. A clock generator of the microprocessor can also be used as a clock pulse emitter 2 of the measurement control and regulation circuit 10 when a suitable microprocessor is present. At each encoder pulse the microprocessor delivers a reset signal r to an output. The output of the microprocessor 6 is connected with a reset input R of the counter 3.

It is assumed that the microprocessor 6 can implement the real value survey at the required point in time. The counter 3 thus measures the times between two encoder pulses by counting the clock pulses. The microprocessor reads out this counter and determines the associated transport speed v from the corresponding count value Z and by means of a constant K (product of period duration P and the traveled transport path s corresponding to the structural parameters of the drive) that is stored in a non-volatile manner.

After each rotation of the motor shaft, a predetermined value of the traveled transport path s (which is constant due to unchanged mechanical design of the encoder) can thereby form the basis of the calculation. It even remains constant when the processor cannot implement the real value survey at the requested point in time. Only the count value Z has changed and leads to an incorrect value of the transport speed v. However, given motors a sudden speed change is impossible due to the moments of inertia. The microprocessor is programmed to sort out individual measurement values of a sudden speed change and to make them ineffectual.

Every value of the transport speed v is stored. The speed values determined to be incorrect due to the processor load are sorted out and corrected under the following criteria:

$$v_n > V_- \text{ and } v_{n-1} < V_- \qquad /7/$$

with $$V_- = 1/4 \sum_{q=n-4}^{n-1} V_q = (v_{n-1} + v_{n-2} + v_{n-3} + v_{n-4})/4 \qquad /8/$$

and $$Z_n < Z_- \text{ and } Z_{n-1} > Z_- \qquad /9/$$

with $$Z_- = 1/4 \sum_{q=n-4}^{n-1} Z_q = (Z_{n-1} + Z_{n-2} + Z_{n-3} + Z_{n-4})/4 \qquad /10/$$

The current speed value of the transport speed v is compared with an arithmetic speed comparison mean $V_-$ from a group of previously determined speed values $v_{n-1}$, $v_{n-2}$, $v_{n-3}$, $v_{n-4}$. If the current speed value $v_n$ of the goods in a transport device or the rotation speed $v_u$ of a drive motor shaft or of an encoder disc is greater than the average value $V_-$ and the speed value $v_{n-1}$ determined immediately beforehand is smaller than the average value $V_-$, the determined current speed value is sorted out in order to replace it with an average value from the current speed value and the previous speed value. A first correction value results as an arithmetic mean:

$$M1 = (v_{n-1} + v_n)/2 \qquad /11/$$

Alternatively a speed v is not determined from the current count value V; rather, the count value is corrected directly from the current count value $Z_n$ and is compared with the arithmetic count value comparison mean $Z_-$ obtained from a group of a previously determined count values $Z_{n-1}$, $Z_{n-2}$, $Z_{n-3}$ and $Z_{n-4}$. If the current count value $Z_n$ of the transport speed is smaller than the count value comparison mean $Z_-$ and the previously determined count value $Z_{n-1}$ is greater than the count value comparison mean $Z_-$, the current count value $Z_n$ and the previous count value $Z_{n-1}$ are averaged with one another, and a second correction value alternatively results as an arithmetic mean:

$$M2 = Z_1 + Z_n)/2 \qquad /12/$$

The arithmetic mean M1 or M2 (which is also designated as a corrected measurement value or correction value) is stored in RAM. Such a correction makes a speed change by the motor regulation due to a sporadically occurring incorrect measurement value. Due to the moments of inertia, a sudden speed change is physically not possible in motors, such that a single deviating measurement value can be detected and at least partially corrected. This does in fact require an increased software expenditure. However, the hardware expenditure for the measurement arrangement according to FIG. 3 is advantageously small. Moreover, in an alternative circuit for the application of the correction method the non-volatile memory 5 for desired values can be omitted if the desired values are provided in a different manner, for example by means of a keyboard of the post-processing device (not shown).

Figure 4:
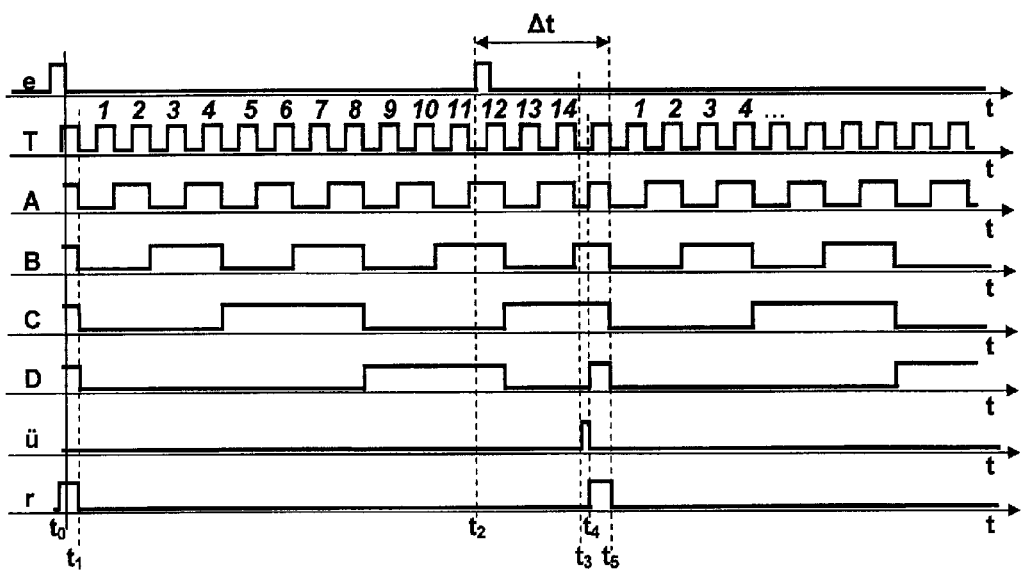
FIG. 4 is a pulse/time diagram for a measurement workflow in the simplified hardware measurement arrangement of FIG. 3.

FIG. 4 shows a pulse/time diagram for the measurement workflow in the simplified hardware measurement arrangement. After an interrupt caused by the occurrence of an encoder pulse, at the point in time $t_0$ a reset pulse r is triggered that leads to the resetting of the count value Z to an initial value $Z_0$, such that all outputs A, B, C and D of the counter lead [sic] low-level at the point in time $t_1$, for example. Given an H/L edge of the first clock pulse 1 at the clock input T, the switching state at the output A flips from low-level to high-level. The counter 3 begins to count the clock pulses applied at the clock input T forwards, which leads to corresponding pulse curves at the outputs A, B, C and D of the counter. If an encoder pulse of the signal e occurs again, for example after the eleventh clock pulse 11, a data transfer by the microprocessor occurs first, which microprocessor then generates a reset signal r. It is apparent that a new measurement is not possible immediately after the occurrence of an encoder pulse of the signal e because the microprocessor is still busy with other tasks. By counting clock pulses 1 through 11, the counter 3 measures not only the time duration between two encoder pulses but moreover a time duration after the second encoder pulse in which the microprocessor is busy. A further counting of the clock pulses from 12 through 14 ensues until the microprocessor can reset the counter. The measurement is thereby disadvantageously incorrect and the time duration Δt is extended by three clock pulses from 12 to 14, for example, during which no measurement is possible. However, this does not interfere with the regulation process. An occurrence of extensions of other time durations Δt during the measurement should not be precluded by the preceding example. However, it should be precluded that the microprocessor is busy longer than normal in the majority of measurements. The arithmetic mean M1 or M2 therefore lies closer to the normal busy duration of the microprocessor than to the extended busy duration. In contrast to the correction case that results from the extension for the current speed value $v_n$ or, respectively, count value $Z_n$, the previously determined speed value $v_{n-1}$ or, respectively, count value $Z_{n-1}$ can be stored without correction immediately after the measurement.

Figure 5:
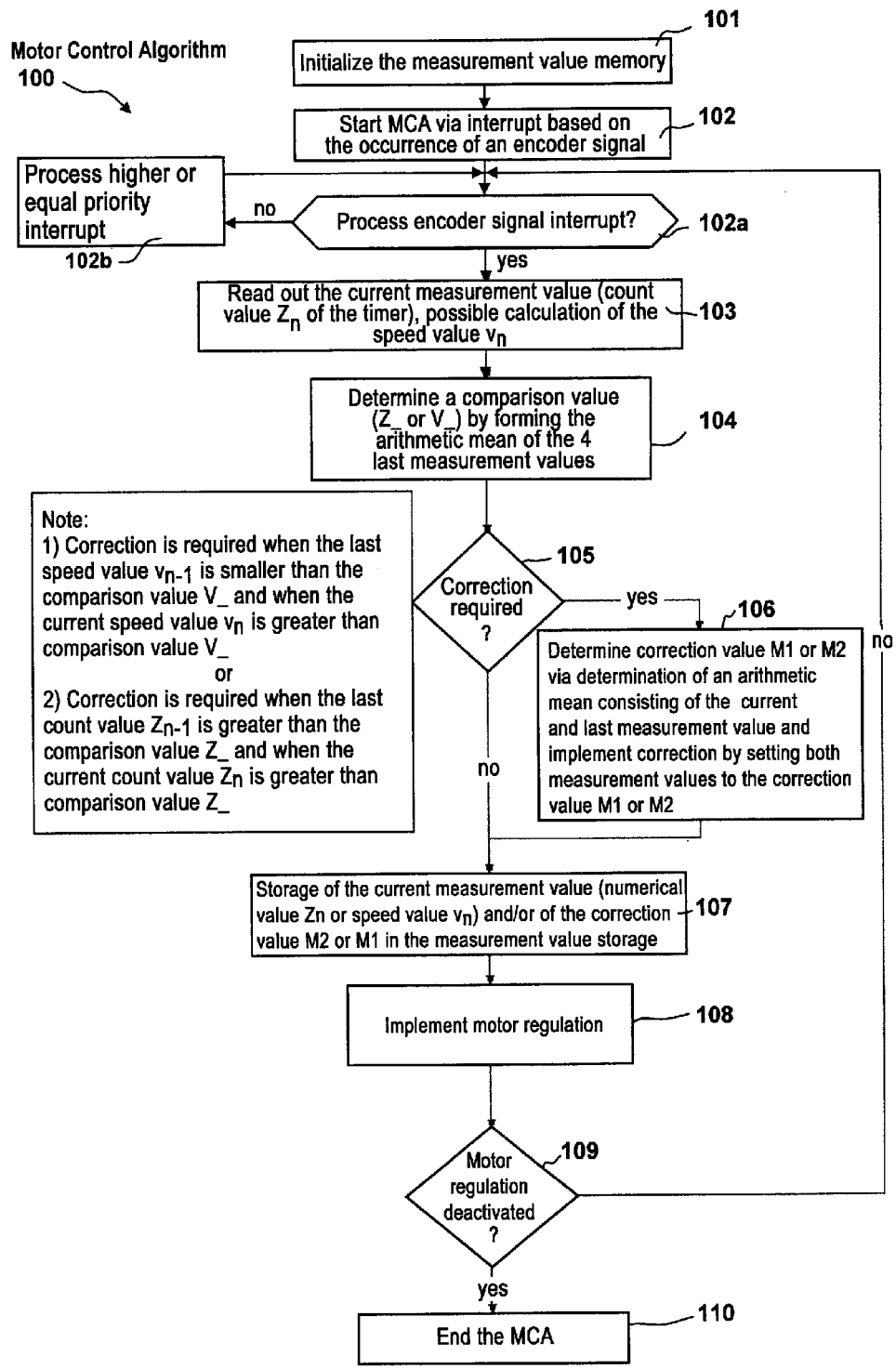
FIG. 5 is a flowchart for a measurement workflow and for measurement value correction in accordance with the invention.

A flowchart of the measurement workflow and of the measurement value correction by the microprocessor is shown in FIG. 5. The measurement workflow and the measurement value correction are thereby contained in the motor control algorithm (MCA). An initialization of the measurement value memory of the microprocessor or, respectively, of the microprocessor controller ensues in the first step 101 after the start. All memory spaces are thereby set to the value of zero.

The measurement value memory (RAM) is provided to store speed values and/or count values (time). In the second step 102 the motor control algorithm (MCA) is started and the measurement is begun as soon as an encoder pulse is determined. In such a case an interrupt is generated and a timer is started.

The second step 102 includes a first interrogation step 102*a* and at least one further sub-step 102*b* for handling of interrupt routines of the microprocessor corresponding to an established ranking. An interrupt is also triggered upon occurrence of an additional encoder pulse. In the sub-step 102*a* it is checked whether such an interrupt based on an encoder signal should be processed. If that is not the case, a further interrupt signal of equal or higher priority can then be processed and the workflow branches back to the start of the sub-step 102*a*. However, immediately after the start of the MCA the case quickly exists that a further interrupt based on an encoder signal should be processed. The workflow then branches to a third step 103 in order to interrogate the timer and end the measurement.

A readout of the current count value $Z_n$ of the timer and possibly a calculation of the associated speed value $v_n$ ensues in the third step 103. The measurement value (count or, respectively, speed value) is thereby initially stored in a volatile manner in the measurement value memory (RAM). The timer is subsequently restarted by the microprocessor. A determination of a comparison value ensues in a subsequent fourth step 104 by forming an arithmetic mean across a number of stored preceding measurement values (count or, respectively, speed values). The comparison value Z_ is initially set to a predetermined value and V_ is initially set to "zero". Every new measurement value leads to a drop or rise of the comparison value and to a run-up of the motor regulation. From the fourth step 104 the workflow branches to a second interrogation step 105 in which it is established whether a measurement value correction is required. A measurement value correction ensues when the criteria of the inequalities /7/ or, respectively, /9/ are satisfied, i.e. given $v_n > V_-$ and $v_{n-1} < V_-$, or $Z_n < Z_-$ and $Z_{n-1} > Z_-$.

If a measurement value correction is required, the workflow branches to the sixth step 106 in order to implement the correction by means of forming an arithmetic mean across the last two measurement values according to the equations /11/ or, respectively, /12/. The arithmetic mean M1 or M2 is subsequently stored as a corrected measurement value in the seventh step 107. Otherwise, if no measurement value correction is required the workflow branches directly from the second interrogation step 105 to the seventh step 107 in order to store the current measurement value.

A use of the evaluated measurement values ensues in a subsequent eighth step 108 in a typical manner for the motor regulation. A third interrogation step 109 follows the eighth step 108 in order to establish whether the motor regulation should be stopped. If that is the case, the workflow branches from the third interrogation step 109 to a step 110 to end the motor control algorithm.

However, if that is not the case, the workflow branches back from the second interrogation step 109 to the start of the sub-step 102*a*.

Figure 6:
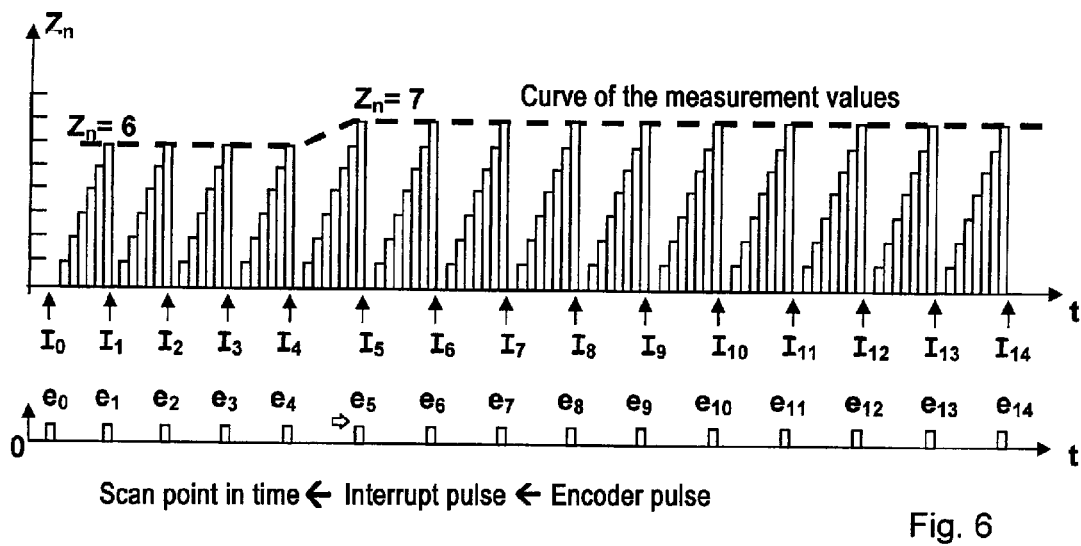
FIGS. 6 and 7 illustrate count value/time and encoder pulse/time diagrams.
Figure 7:
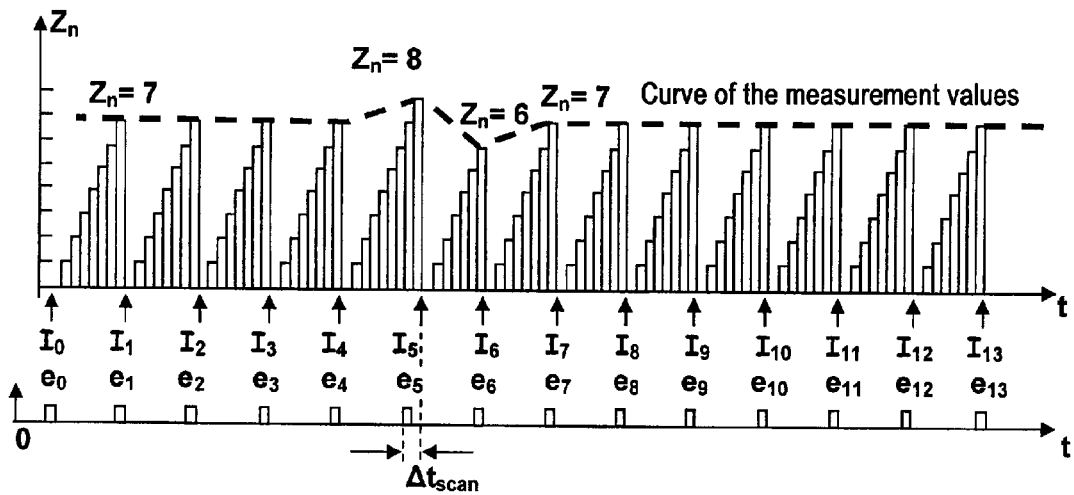

A count value/time diagram and an encoder pulse/time diagram are shown in FIGS. 6 and 7. For clarification of the readout of the count values $Z_n$ from the timer, each count value is represented as a bar and sampled at a point in time that immediately follows the interrupt signal. However, it is not bars but rather a digital count value that is actually sampled, as is apparent from the circuit according to FIG. 3. FIG. 6 shows the time curve of the measurement values of a measurement series with gradually changing measurement values. An interrupt signal $I_0$ is triggered by the occurrence of an encoder pulse $e_0$ and the timer is started. Upon occurrence of an encoder pulse $e_1$, the interrupt signal $I_1$ is triggered and the count value of the timer is read out and cached in RAM (see FIG. 3). The incrementing of the timer up to the occurrence of an encoder pulse and the sampling of the count value $Z_n = 6$ that occurs thereupon is indicated by growing bars.

A sampling of the count value $Z_n = 6$ initially ensues in the shown example. The speed then gradually reduces and the periodically recurring encoder pulses $e_5$ through $e_{14}$ occur delayed, wherein the delay is identified with a small white arrow. The encoder pulses $e_1$ through $e_4$ occur periodically and at a smaller time interval than the likewise periodically occurring encoder pulses $e_5$ through $e_{14}$. This leads to the situation that a count value $Z_n = 7$ higher by one step is sampled as of the encoder pulse $e_4$. A "step" is a constant rate of change of at least one.

FIG. 7 shows the time curve of the measurement values of a measurement series with a suddenly changing measurement value. An interrupt signal $I_0$ is triggered again by the occurrence of an encoder pulse $e_0$ and the timer is started. Upon occurrence of an encoder pulse $e_1$ the interrupt signal $I_1$ is triggered again immediately afterwards and the count value of the timer is read out and cached in RAM (see FIG. 3). The incrementing of the timer up to the occurrence of an encoder pulse and the sampling of the count value $Z_n=7$ ensuing thereupon is clarified by growing bars.

A sampling of the count value $Z_n=7$ initially ensues in the shown example. The encoder pulses $e_1$ through $e_4$ occur periodically and at the same time interval as the likewise periodically occurring encoder pulses $e_5$ through $e_{13}$. However, the measurement time of the timer is extended as of the encoder pulse $e_4$ up to the occurrence [sic] since the interrupt signal $I_5$ is processed with a time delay. This leads to a sampling of the timer delayed by $\Delta t_{scan}$, whereby now a count value $Z_n=8$ higher by one step is sampled. In the shown example it is assumed that the interrupt signal $I_6$ is again triggered immediately afterwards upon occurrence of a subsequent encoder pulse $e_6$, and the count value $Z_n=6$ of the timer is read out and cached in RAM (see FIG. 3). The measurement time of the timer is shortened since the interrupt signal $I_6$ is processed with no time delay. This leads to the signal that a count value $Z_n=6$ reduced by two steps is sampled with the encoder pulse $e_6$ and a suddenly changing measurement value is sampled. Again a "step" is a constant rate of change of at least one.

As of the encoder pulse $e_6$ the measurement time of the timer is constant again (as at the start of the measurement series) since the interrupt signals $I_6$ through $I_{13}$ are again processed without time delay.

Figure 8:
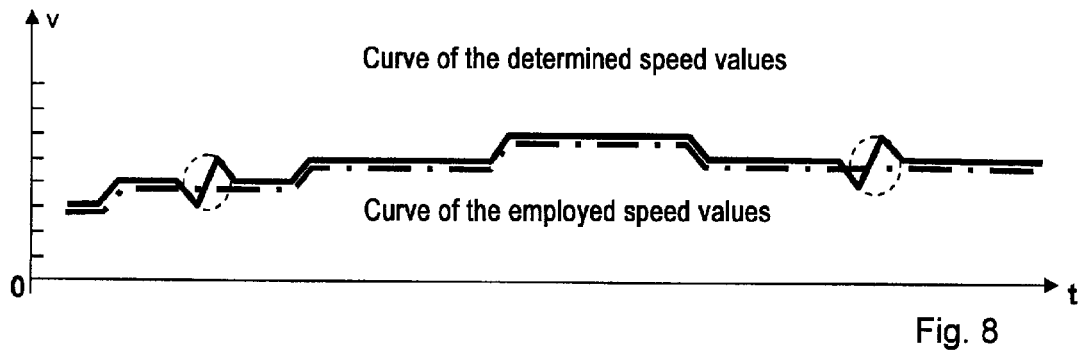
FIG. 8 depicts the time curve of speed values.

The time curve of determined speed values is shown using FIG. 8. The individual measurement values of the timer are converted into speed values and stored by the microprocessor. The individual speed values of a measurement series with a sudden change of the real value from a previous speed value to the current speed value are indicated by a dashed circle. This is a change with the step width occurring there which is physically impossible. Each read measurement value with a sudden change is therefore replaced by an at least partially corrected measurement value which is represented by a dash-dot line for employed real speed values. It is apparent that suddenly changing speed values differ from gradually changing speed values. The latter are a change with an occurring step width that is physically possible.

Although modifications and changes may be suggested by those skilled in the art, it is the intention of the inventor to embody within the patent warranted hereon all changes and modifications as reasonably and properly come within the scope of his contribution to the art.

I claim as my invention:

1. A correction method for processor-controlled digital regulation of a drive motor, comprising the steps of:
   from a circuit consisting of an encoder and a timer, producing a measurement series, consisting of a plurality of individual measurement values representing an operational characteristic of a drive motor;
   in a processor, monitoring successive measurement series obtained from said circuit to identify any individual measurement values therein that exhibit a sudden, non-gradual change of a real value thereof from individual measurement value-to-individual measurement value in the measurement series being monitored;
   in said processor, sorting out from said measurement series any of said measurement values therein exhibiting said sudden, non-gradual change; and
   in said microprocessor, generating an at least partially corrected measurement value and replacing the sorted out measurement value in the measurement series with said at least partially corrected measurement value.

2. A correction method as claimed in claim 1 comprising generating said at least partially corrected measurement value as an average value formed from a current measurement value and a previous measurement value in the measurement series being monitored.

3. A correction method as claimed in claim 2 comprising, in said processor, calculating a speed value from each count value.

4. A correction method as claimed in claim 3 comprising, in said processor, evaluating said speed values to identify said sudden, non-gradual change, and generating said at least partially corrected measurement value as an at least partially corrected speed value, and providing an adjustment pulse to said drive motor dependent thereon.

5. A correction method as claimed in claim 4 comprising correcting a current speed value when said current speed value is greater than the arithmetic mean of a group of previously determined speed values, and immediately-preceding speed value is smaller than said arithmetic mean.

6. A correction method as claimed in claim 5 comprising generating said at least partially corrected speed value by averaging a current speed value and a previous speed value with each other to obtain an arithmetic mean therefrom as said at least partially corrected measurement value.

7. A correction method as claimed in claim 3 comprising using count values to calculate said speed values selected from the group consisting of count values representing a speed of goods in a transport device operated by the drive motor, count values representing a rotational speed of a drive motor shaft of the drive motor, and count values obtained from an encoder disc that co-rotates with a drive shaft of said drive motor.

8. A correction method as claimed in claim 1 comprising generating said real values as count values having a number that is proportional to a length of a measurement time period in which said measurement value series is obtained by said circuit.

9. A correction method as claimed in claim 8 comprising, in said processor, evaluating said count values to generate said at least partially corrected measurement value, and, dependent on said at least partially corrected measurement value, generating an adjustment pulse for said drive motor.

10. A correction method as claimed in claim 9 comprising correcting said measurement value, as a current count value, when said current count value of a counter for time measurement in said circuit is smaller than an arithmetic count value mean of a group of previous count values, and an immediately preceding count value is smaller than said arithmetic count value average.

11. A correction method as claimed in claim 10 comprising correcting said current count value by forming an average of said current count value with a previous count value as an arithmetic mean, and storing said arithmetic mean as a corrected measurement value.

* * * * *